United States Patent
Cardona

(10) Patent No.: US 10,821,534 B2
(45) Date of Patent: Nov. 3, 2020

(54) CYLINDER WELDING SYSTEM

(71) Applicant: Raul Cardona, Needville, TX (US)

(72) Inventor: Raul Cardona, Needville, TX (US)

( * ) Notice: Subject to any disclaimer, the term of this patent is extended or adjusted under 35 U.S.C. 154(b) by 509 days.

(21) Appl. No.: 15/707,614

(22) Filed: Sep. 18, 2017

(65) Prior Publication Data

US 2019/0084066 A1    Mar. 21, 2019

(51) Int. Cl.
| | | |
|---|---|---|
| *B23K 37/053* | (2006.01) | |
| *F16L 13/02* | (2006.01) | |
| *B23K 9/028* | (2006.01) | |
| *B23K 37/02* | (2006.01) | |

(52) U.S. Cl.
CPC .......... *B23K 9/0284* (2013.01); *B23K 9/0286* (2013.01); *B23K 37/027* (2013.01); *B23K 37/0276* (2013.01)

(58) Field of Classification Search
CPC ............ B23K 2101/10; B23K 37/0276; B23K 37/0531; B23K 9/0284
See application file for complete search history.

(56) References Cited

U.S. PATENT DOCUMENTS

| | | | | |
|---|---|---|---|---|
| 3,644,977 A | * | 2/1972 | Valentine ........... | B23K 37/0531 |
| | | | | 29/244 |
| 4,338,153 A | * | 7/1982 | Zimmerman ....... | B29C 66/8221 |
| | | | | 156/391 |
| D287,135 S | | 12/1986 | Nagatani et al. | |
| 4,842,186 A | * | 6/1989 | Doyle ................. | B23K 9/0352 |
| | | | | 164/429 |
| 5,227,601 A | * | 7/1993 | Black ...................... | B23K 9/12 |
| | | | | 219/124.33 |
| 5,568,893 A | * | 10/1996 | Depperman ....... | B23K 37/0531 |
| | | | | 228/44.5 |
| 6,051,803 A | * | 4/2000 | Hale, Jr. ............... | B23K 10/00 |
| | | | | 219/121.39 |
| 7,378,612 B2 | | 5/2008 | Takahashi et al. | |
| 7,780,065 B2 | | 8/2010 | Vermaat | |
| 8,288,687 B2 | | 10/2012 | Inoue et al. | |
| 8,569,651 B2 | | 10/2013 | Lipnevicius | |
| 2008/0264451 A1 | * | 10/2008 | Shimamura ........... | B23K 37/02 |
| | | | | 134/22.11 |
| 2008/0302773 A1 | | 12/2008 | Ikeda et al. | |
| 2010/0147047 A1 | * | 6/2010 | Kerdiles ................ | B23K 9/282 |
| | | | | 72/367.1 |
| 2010/0176106 A1 | * | 7/2010 | Christensen ....... | B23K 37/0252 |
| | | | | 219/137 R |

(Continued)

*Primary Examiner* — Lorne E Meade
*Assistant Examiner* — Lawrence H Samuels

(57) ABSTRACT

A cylinder welding system includes a welder that has a control unit, a welding head and a wire feed. Each of the wire feed and the welding head is electrically coupled to the control unit. A cart is provided and the cart is rollably positioned within a cylinder. A rotation unit is rotatably coupled to the cart and the rotation unit engages an inside surface of the cylinder. The rotation unit is electrically coupled to the control unit such that the control unit controls operational parameters of the rotation unit. In this way the rotation unit is actuated to rotate along the inside surface of the cylinder. The welding head is coupled to the rotation unit to weld the inside of the cylinder when the rotation unit rotates along the inside of the cylinder. In this way one cylinder may be automatically welded to another cylinder.

12 Claims, 6 Drawing Sheets

(56) References Cited

U.S. PATENT DOCUMENTS

| | | | |
|---|---|---|---|
| 2011/0107571 A1* | 5/2011 | Kerdiles | B23K 9/282 |
| | | | 29/90.7 |
| 2014/0091129 A1* | 4/2014 | Peters | B23K 9/0284 |
| | | | 228/102 |
| 2014/0299650 A1 | 10/2014 | Obaditch et al. | |
| 2017/0182605 A1* | 6/2017 | Rajagopalan | B23K 9/32 |

* cited by examiner

CYLINDER WELDING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to welding devices and more particularly pertains to a new welding device for welding cylinders together.

BRIEF SUMMARY OF THE INVENTION

An embodiment of the disclosure meets the needs presented above by generally comprising a welder that has a control unit, a welding head and a wire feed. Each of the wire feed and the welding head is electrically coupled to the control unit. A cart is provided and the cart is rollably positioned within a cylinder. A rotation unit is rotatably coupled to the cart and the rotation unit engages an inside surface of the cylinder. The rotation unit is electrically coupled to the control unit such that the control unit controls operational parameters of the rotation unit. In this way the rotation unit is actuated to rotate along the inside surface of the cylinder. The welding head is coupled to the rotation unit to weld the inside of the cylinder when the rotation unit rotates along the inside of the cylinder. In this way one cylinder may be automatically welded to another cylinder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
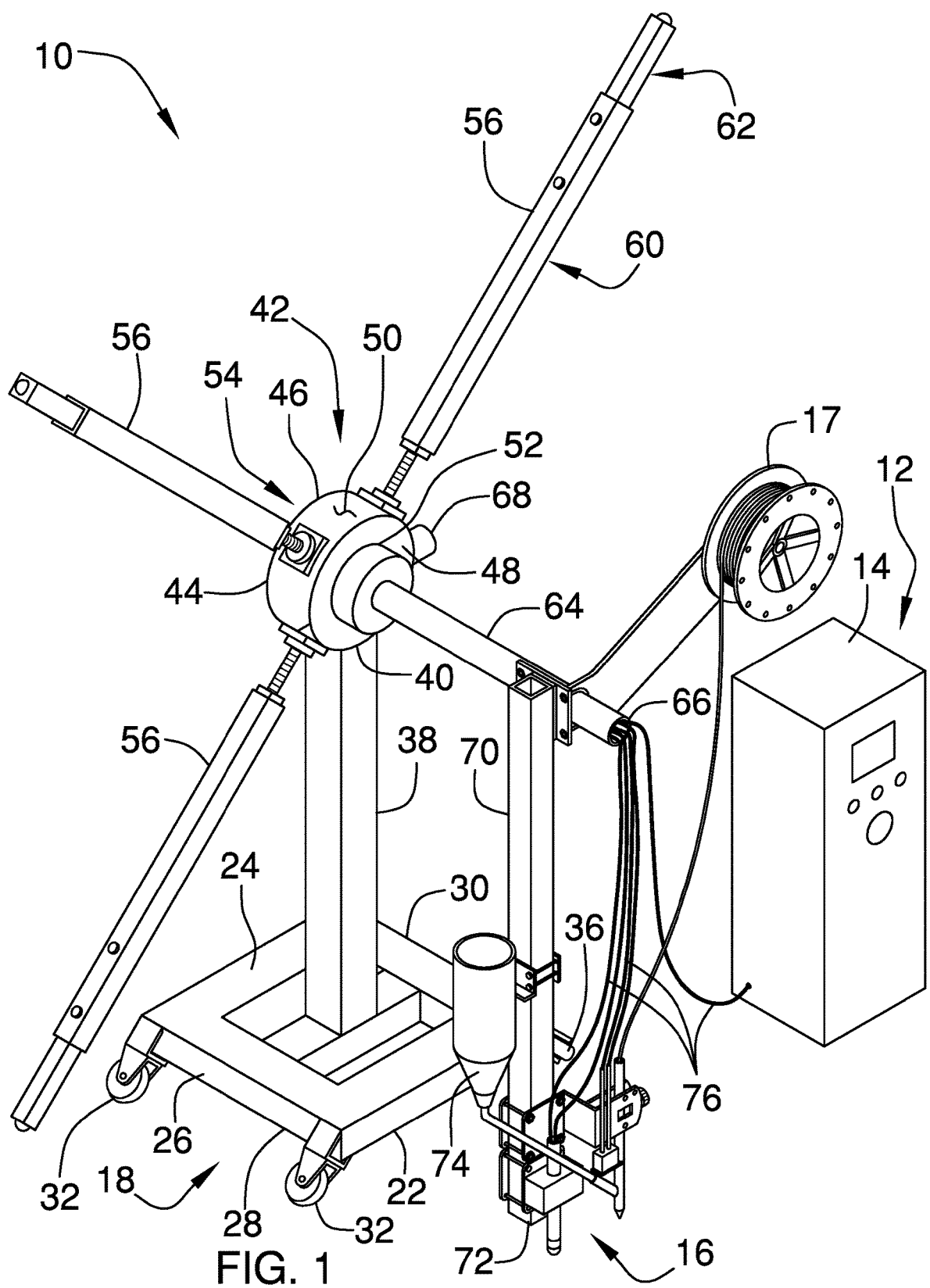
FIG. 1 is a perspective view of a cylinder welding system according to an embodiment of the disclosure.
Figure 2:
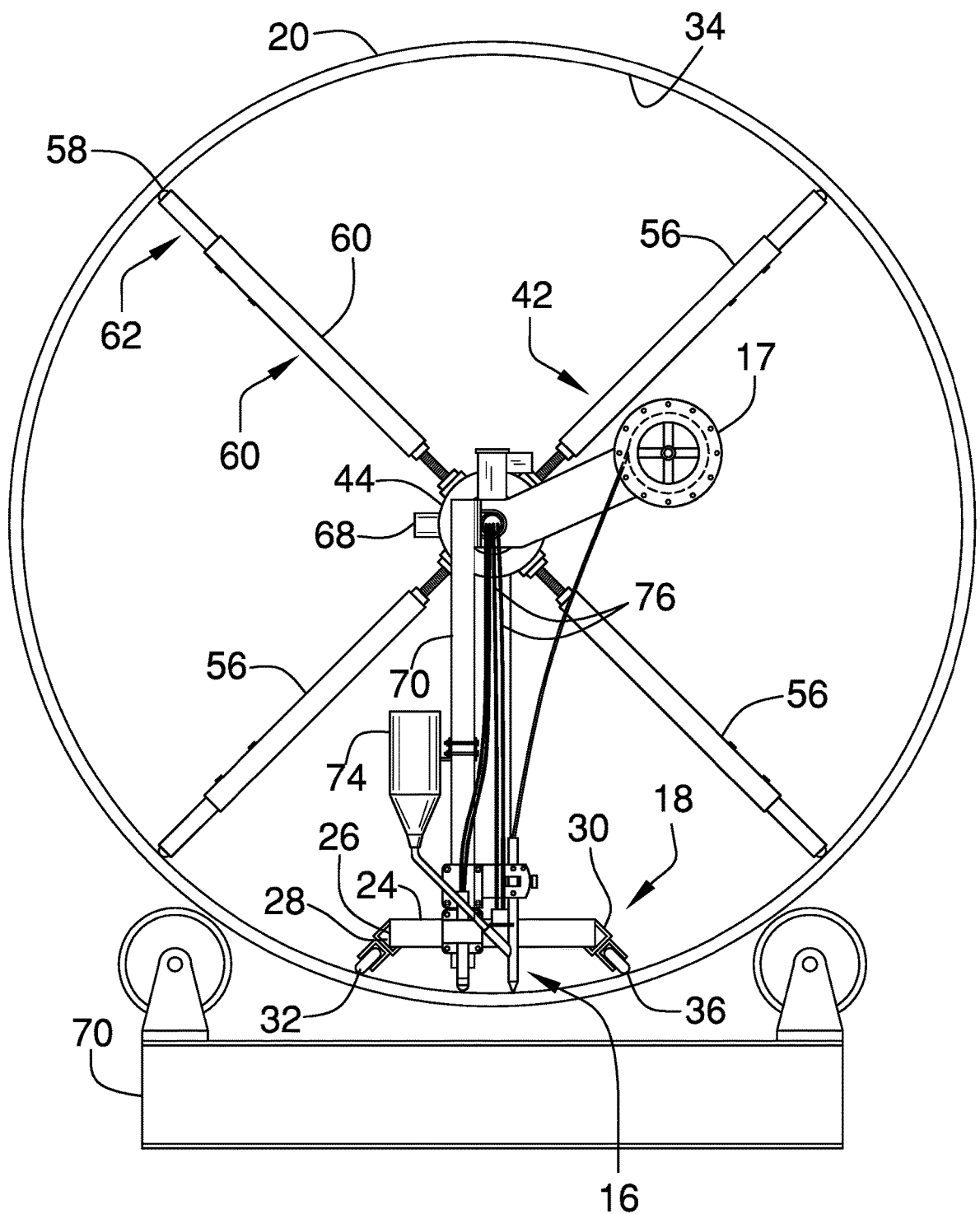
FIG. 2 is a perspective in use view of an embodiment of the disclosure.
Figure 3:
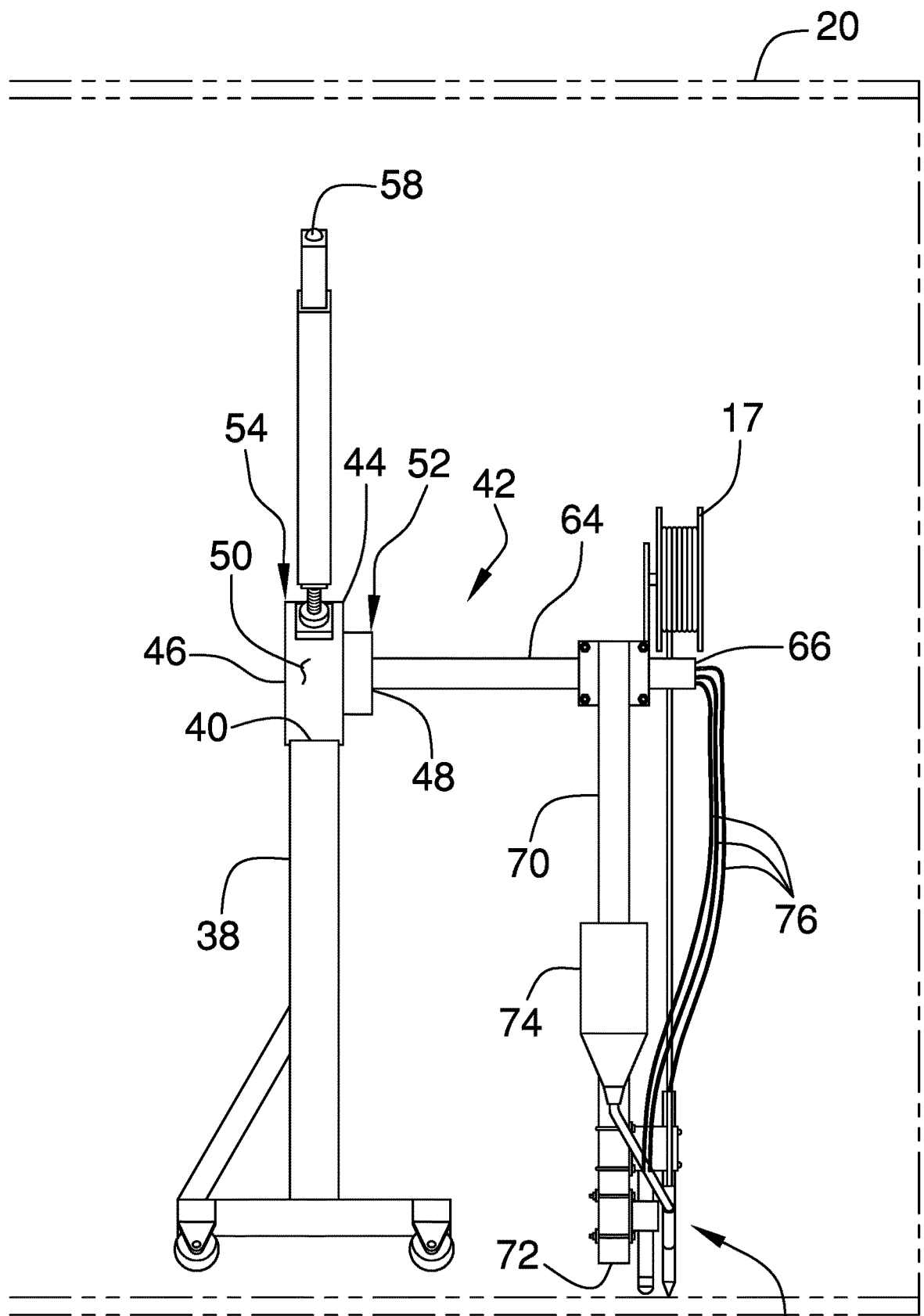
FIG. 3 is a right side perspective view of an embodiment of the disclosure.
Figure 4:
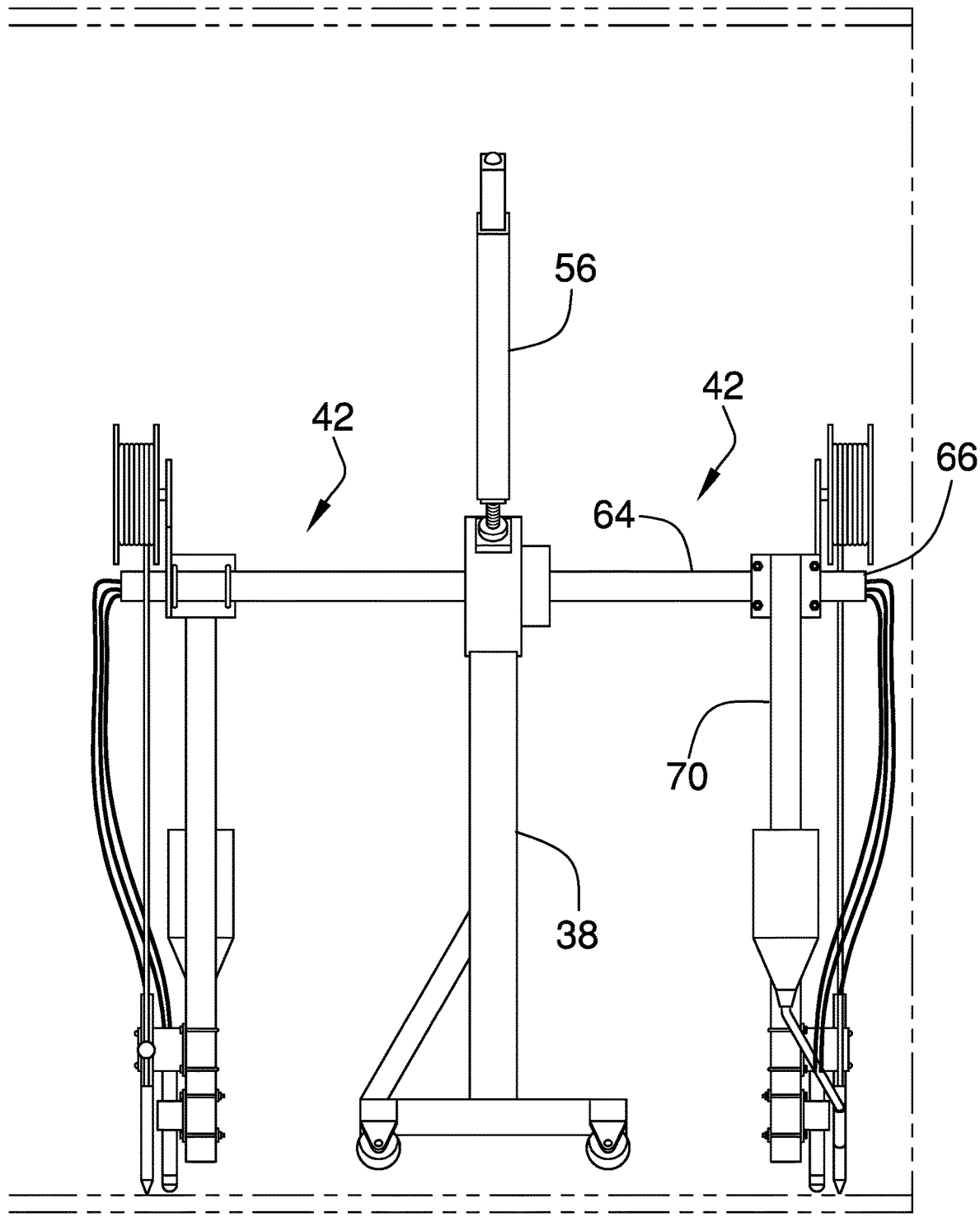
FIG. 4 is a left side perspective view of an embodiment of the disclosure.
Figure 5:
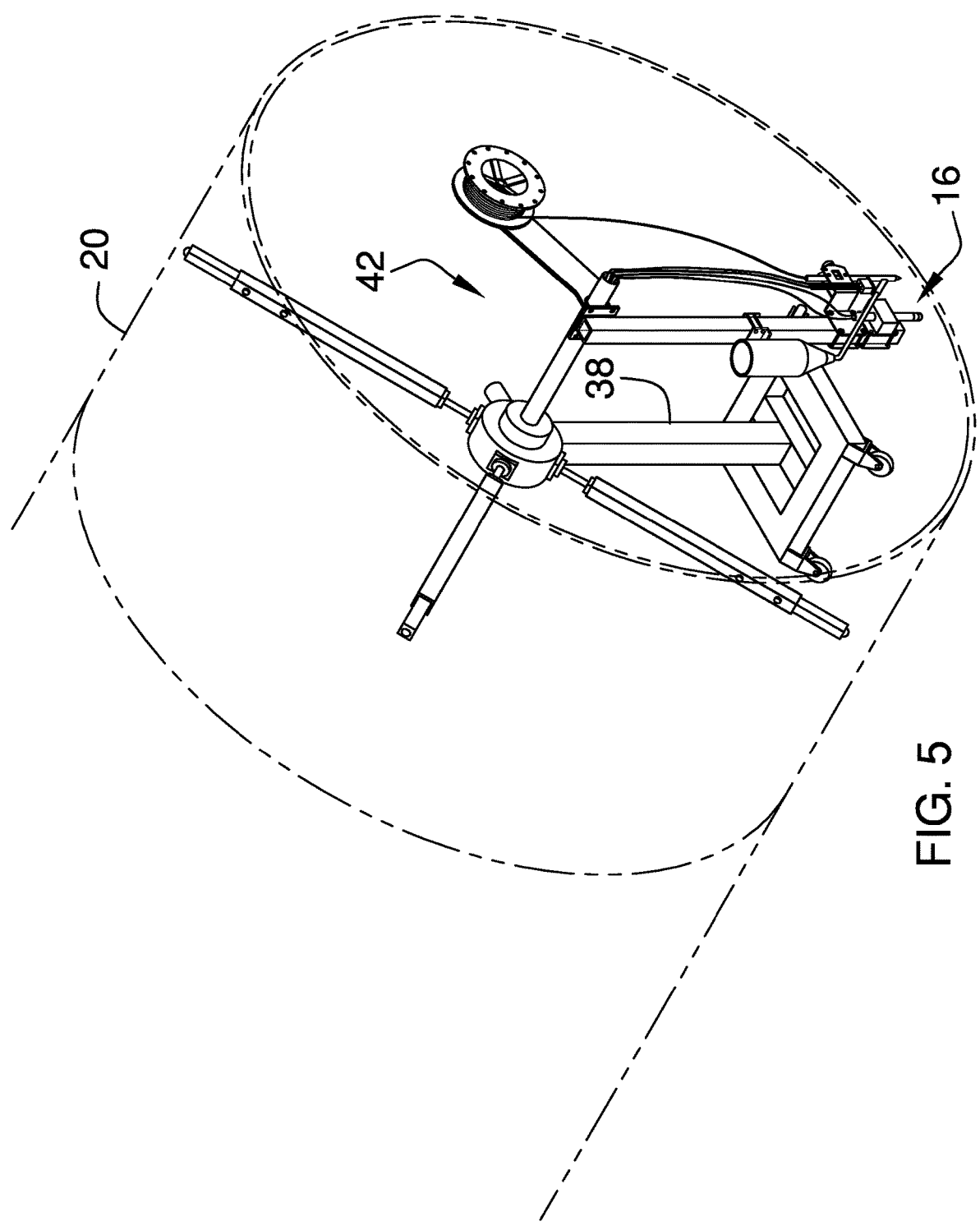
FIG. 5 is a top perspective view of an embodiment of the disclosure.
Figure 6:
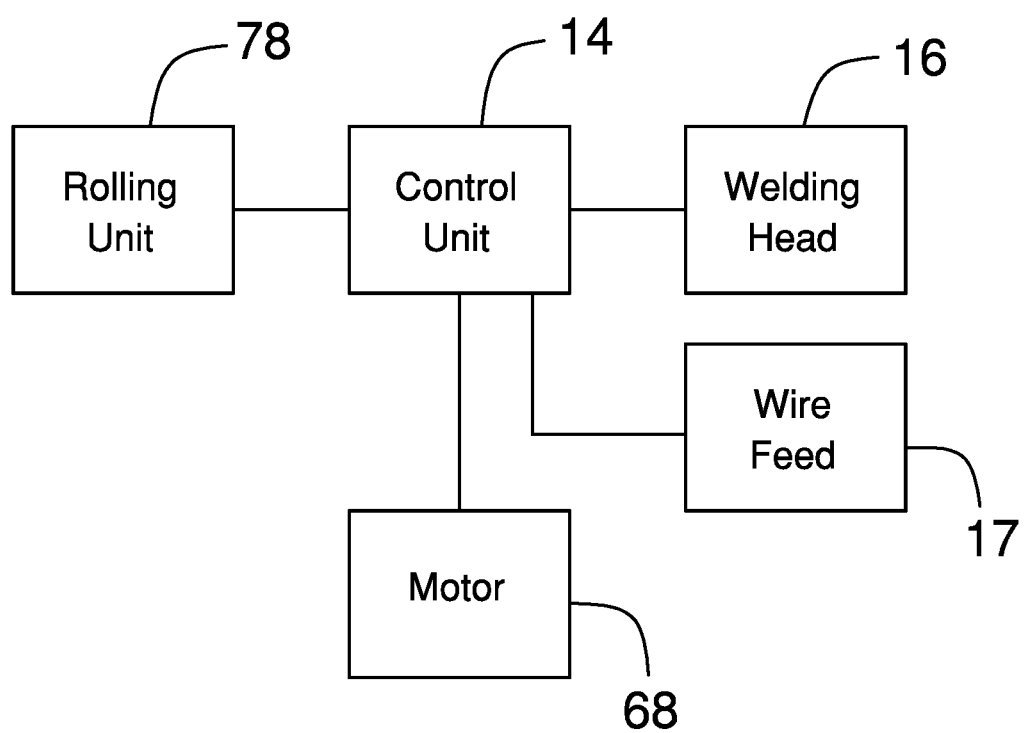
FIG. 6 is a schematic view of an embodiment of the disclosure.

With reference now to the drawings, and in particular to FIGS. 1 through 6 thereof, a new welding device embodying the principles and concepts of an embodiment of the disclosure and generally designated by the reference numeral 10 will be described.

As best illustrated in FIGS. 1 through 6, the cylinder welding system 10 generally comprises a welder 12 that has a control unit 14, a welding head 16 and a wire feed 17. Each of the wire feed 17 and the welding head 16 is electrically coupled to the control unit 14. The welder 12 may be a Tig welder, a Mig welder, and any other type of electronic welder. Additionally, the welder 12 may be a robotic welder of any conventional design. Moreover, the welder 12 may be a welder 12 commonly used for welding tanks, cylinders and other large, metal cylinders.

A cart 18 is provided and the cart 18 is rollably positioned within a cylinder 20. The cylinder 20 may be a tank, a water cylinder and any other large, metal cylinder that is welded to another large, metal cylinder. The cart 18 comprises a base 22 that has a top side 24 and a peripheral surface 26 and the peripheral surface 26 has a first lateral side 28 and a second lateral side 30. A pair of first wheels 32 is provided and each of the first wheels 32 is rotatably coupled to and angles downwardly from the first lateral side 28. Each of the first wheels 32 rollably engages a curvature of an inside surface 34 of the cylinder 20.

A pair of second wheels 36 is provided and each of the second wheels 36 is rotatably coupled to and angles downwardly from the second lateral side 30. Each of the second wheels 36 rollably engages the curvature of the inside surface 34 of the cylinder 20. Moreover, each of the first 32 and second 36 wheels selectively rolls the base 22 forwardly and rearwardly in the cylinder 20. In this way the cart 18 is selectively positioned at a selected point along the cylinder 20. Each of the first 32 and second 36 wheels are urged toward each other. In the base 22 is aligned with a longitudinal axis extending through the cylinder 20 when the base 22 is moved in the cylinder 20. Thus, the cart 18 moves in a straight line with the cart 18 is urged forwardly and rearwardly in the cylinder 20.

A member 38 is coupled to and extends upwardly from the top side 24 of the base 22 such that the member 38 is vertically oriented in the cylinder 20. The member 38 has a distal end 40 with respect to the base 22. A rotation unit 42 is rotatably coupled to the cart 18 and the rotation unit 42 engages the inside surface 34 of the cylinder 20. The rotation unit 42 is electrically coupled to the control unit 14 such that the control unit 14 controls operational parameters of the rotation unit 42.

The rotation unit 42 rotates along the inside surface 34 of the cylinder 20 when the control unit 14 turns the rotation unit 42 on. The welding head 16 is coupled to the rotation unit 42. Thus, the welding head 16 may weld the inside of the cylinder 20 when the rotation unit 42 rotates along the inside of the cylinder 20. In this way one cylinder 20 may be welded to another cylinder 20 with a high degree of accuracy compared to manually welding cylinders 20 together.

The rotation unit 42 comprises a hub 44 that has a front side 46, a back side 48 and an outer surface 50 extending therebetween. The outer surface 50 is coupled to the distal end 40 of the member 38. Additionally, the hub 44 has a central portion 52 that is rotatably coupled to an outer portion 54. The central portion 52 selectively rotates about an axis that is perpendicular to a vertical axis. The hub 44 may be a ball bearing hub or the like.

A plurality of first arms 56 is provided and each of the first arms 56 is coupled to and extends outwardly from the outer surface 50 of the hub 44. The first arms 56 are spaced apart from each other and are distributed around the hub 44. Each of the first arms 56 has a distal end 58 with respect to the hub 44 and the distal end 58 corresponding to each of the first arms 56 engages the inside of the cylinder 20. The distal end 58 corresponding to each of the first arms 56 is equidistant from the hub 44. In this way each of the first arms 56 centrally positions the hub 44 in the cylinder 20.

Each of the first arms 56 has a first half 60 that is slidably coupled to a second half 62 such that each of the first arms 56 has a telescopically adjustable length. In this way plurality of first arms 56 facilitates the hub 44 to be centrally positioned in a variety of sizes of cylinder 20. Each of the first arms 56 may include a screw that is coupled to and extends outwardly from the outer surface 50 of the hub 44. Each of the first arms 56 may be threadably coupled to the corresponding screw A tube 64 is coupled to and extends away from the front side 46 of the hub 44. The tube 64 is positioned on the central portion 52 of the hub 44 such that the tube 64 rotates with the central portion 52. The tube 64 has a distal end 66 with respect to the hub 44. A motor 68 is coupled to the hub 44 and the motor 68 engages the central portion 52 of the hub 44. In this way the motor 68 rotates the central portion 52 when the motor 68 is turned on. The motor 68 is electrically coupled to the welder 12 control unit 14 such that the welder 12 control unit 14 controls a rotational speed of the motor 68. The motor 68 may be in mechanical communication with the central portion 52 of the hub 44 with a pair of complementary gears and any other conventional means. Additionally, the motor 68 may be an electric motor 68 or the like.

A second arm 70 is coupled to and extends downwardly from the tube 64 and the second arm 70 is aligned with the distal end 66 of the tube 64. The second arm 70 has a distal end 72 with respect to the tube 64 such that the distal end 72 of the second arm 70 is spaced from the inside surface 34 of the cylinder 20. The tube 64 urges the distal end 72 of the second arm 70 to rotate about a circumference of the inside surface 34 of the cylinder 20 when the motor 68 is turned on. The second arm 70 may have a first section being slidably coupled to a second section such that the second arm 70 has a telescopically adjustable length.

The welding head 16 is removably coupled to the second arm 70. The welding head 16 is aligned with the distal end 72 of the second arm 70 to weld the inside surface 34 of the cylinder 20. Additionally, the wire feed 17 is coupled to the second arm 70 to feed welding wire to the welding head 16. A flux can 74 may be coupled to the second arm 70 to supply welding flux to a subarc torch or the like.

A plurality of conductors 76 extends through the tube 64 and selected ones of the conductors 76 is electrically coupled to an associated one of the motor 68 and the wire feed 17. Selected ones of the conductors 76 are electrically coupled to the welding head 16 when the welding head 16 is coupled to the second arm 70. Additionally, selected ones of the conductors 76 are electrically coupled to the control unit 14 of the welder 12. In this way the control unit 14 integrates the function of the welding head 16 with the function of the rotation unit 42. Each of the conductors 76 may be welder control cables of any conventional design. A second rotation unit 42 may be provided and the second rotation unit 42 may be positioned on the back side 48 of the hub 44. In this way a pair of joints may be simultaneously welded.

Additionally, the cylinder 20 may be positioned in a rolling unit 78 and the rolling unit 63 may selectively rotate the cylinder 20. Moreover, the control unit 14 of the welder 12 may be in electrical communication with the rolling unit 63. Thus, the function of the rotation unit 42 and the welding head 16 are integrated into the function of the rolling unit 63. The motor 68 may rotate in an opposite direction and at the same speed as the rolling unit 63. In this way the cart 18, the tube 64, the second arm 70 and the welding head 16 are stationary while the cylinder 20 rotates. The control unit 14 of the welder 12 may have a transceiver for wireless control of the rotation unit 44 and the welding head 16.

In use, the cart 18 and the rotation unit 42 are positioned in the cylinder 20. The selected conductors 76 are each electrically coupled to the control unit 14 and the welding head 16. The cart 18 is positioned at an end of the cylinder 20 when the end of the cylinder 20 is being welded to an end of another cylinder 20. Moreover, the cart 18 is positioned to align the welding head 16 with the joint between each of the cylinder 20*s*. Each of the arms is manipulated to a selected length thereby facilitating the hub 44 to be centrally positioned in the cylinder 20.

The control unit 14 of the welder 12 is manipulated to turn the motor 68 on to a selected speed, to turn the wire feed 17 on and to turn the welding head 16 on. Thus, the welding head 16 is rotated around an entire circumference of the joint between the cylinders 12 to weld the joint. In this way the cylinders 12 are automatically welded together with a high degree of accuracy. Any conventional welding head, cutting head and robotic welding unit may be removably coupled to the second arm 70 and electrically coupled to the control unit 14. In this way the rotation unit 42 facilitates precise welding, precise cutting and other precise metal work to be performed on the cylinders 12. The cart 18 is sequentially rolled between joints of cylinders 12 to weld the cylinders 12 together.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cylinder welding system being configured to be positioned within a cylinder thereby facilitating a plurality of cylinders to be welded together, said system comprising:
   a welder having a control unit, a welding head and a wire feed, each of said wire feed and said welding head being electrically coupled to said control unit;
   a cart being configured to be rollably positioned within a cylinder, said cart comprising a base having a top side and a peripheral surface, said peripheral surface having a first lateral side and a second lateral side;
   a member being coupled to and extending upwardly from said top side of said base wherein said member is configured to be vertically oriented in the cylinder, said member having a distal end with respect to said base; and
   a rotation unit being rotatably coupled to said cart wherein said rotation unit is configured to engage the inside of the cylinder, said rotation unit being electrically coupled to said control unit such that said control unit controls operational parameters of said rotation unit wherein said rotation unit is configured to rotate along the inside of the cylinder, said welding head being coupled to said rotation unit wherein said welding head is configured to weld the inside of the cylinder when said rotation unit rotates along the inside of the cylinder thereby facilitating one cylinder to be welded to another cylinder, said rotation unit comprising a hub having a front side, a back side and an outer surface extending therebetween, said outer surface being coupled to said distal end of said member; and
   a plurality of first arms, each of said first arms being coupled to and extending outwardly from said outer surface of said hub, said first arms being spaced apart from each other and being distributed around said hub, each of said first arms having a distal end with respect to said hub wherein said distal end corresponding to each of said first arms is configured to engage the inside of the cylinder.

2. The system according to claim 1, further comprising a pair of first wheels, each of said first wheels being rotatably coupled to and angling downwardly from said first lateral side wherein each of said first wheels is configured to engage a curvature of an inside of the cylinder.

3. The system according to claim 2, further comprising a pair of second wheels, each of said second wheels being rotatably coupled to and angling downwardly from said second lateral side wherein each of said second wheels is configured to engage the curvature of the inside of the cylinder, wherein each of said first and second wheels is configured to selectively roll said base forwardly and rearwardly in the cylinder.

4. The system according to claim 3, wherein each of said first and second wheels urges said base toward each other wherein said base is configured to be aligned with a longitudinal axis extending through the cylinder when said base is moved in the cylinder.

5. The system according to claim 1, wherein said hub has a central portion being rotatably coupled to an outer portion such that said central portion rotates about an axis being perpendicular to vertical axis.

6. The system according to claim 5, further comprising a motor being coupled to said hub, said motor engaging said central portion of said hub such that said motor rotates said central portion when said motor is turned on, said motor being electrically coupled to said welder control unit such that said welder control unit controls a rotational speed of said motor.

7. The system according to claim 1, wherein said distal end corresponding to each of said first arms is equidistant from said hub wherein each of said first arms is configured to centrally position said hub in the cylinder.

8. The system according to claim 7, wherein each of said first arms has a first half being slidably coupled to a second half such that each of said first arms has a telescopically adjustable length wherein said plurality of first arms is configured to facilitate said hub to be centrally positioned in a variety of sizes of cylinder.

9. A cylinder welding system being configured to be positioned within a cylinder thereby facilitating a plurality of cylinders to be welded together, said system comprising:
   a welder having a control unit, a welding head and a wire feed, each of said wire feed and said welding head being electrically coupled to said control unit;
   a cart being configured to be rollably positioned within a cylinder, said cart comprising a base having a top side and a peripheral surface, said peripheral surface having a first lateral side and a second lateral side;
   a member being coupled to and extending upwardly from said top side of said base wherein said member is configured to be vertically oriented in the cylinder, said member having a distal end with respect to said base; and
   a rotation unit being rotatably coupled to said cart wherein said rotation unit is configured to engage the inside of the cylinder, said rotation unit being electrically coupled to said control unit such that said control unit controls operational parameters of said rotation unit wherein said rotation unit is configured to rotate along the inside of the cylinder, said welding head being coupled to said rotation unit wherein said welding head is configured to weld the inside of the cylinder when said rotation unit rotates along the inside of the cylinder thereby facilitating one cylinder to be welded to another cylinder, said rotation unit comprising a hub having a front side, a back side and an outer surface extending therebetween, said outer surface being coupled to said distal end of said member, said hub having a central portion being rotatably coupled to an outer portion such that said central portion rotates about an axis being perpendicular to vertical axis; and
   a tube being coupled to and extending away from said front side of said hub, said tube being positioned on said central portion of said hub such that said tube rotates with said central portion, said tube having a distal end with respect to said hub.

10. The system according to claim 9, further comprising a second arm being coupled to and extending downwardly from said tube, said second arm being aligned with said distal end of said tube, said second arm having a distal end with respect to said tube wherein said distal end of said second arm is configured to be spaced from the inside of the cylinder, said tube urging said distal end of said second arm to rotate about a circumference of the inside of the cylinder when said motor is turned on.

11. The system according to claim 10, wherein said welding head is removably coupled to said second arm, said welding head being aligned with said distal end of said second arm wherein said welding head is configured to weld the inside of the cylinder, said wire feed being coupled to said second arm.

12. A cylinder welding system being configured to be positioned within a cylinder thereby facilitating a plurality of cylinders to be welded together, said system comprising:
a welder having a control unit, a welding head and a wire feed, each of said wire feed and said welding head being electrically coupled to said control unit;
a cart being configured to be rollably positioned within a cylinder, said cart comprising:
  a base having a top side and a peripheral surface, said peripheral surface having a first lateral side and a second lateral side,
  a pair of first wheels, each of said first wheels being rotatably coupled to and angling downwardly from said first lateral side wherein each of said first wheels is configured to engage a curvature of an inside of the cylinder,
  a pair of second wheels, each of said second wheels being rotatably coupled to and angling downwardly from said second lateral side wherein each of said second wheels is configured to engage the curvature of the inside of the cylinder, wherein each of said first and second wheels is configured to selectively roll said base forwardly and rearwardly in the cylinder, wherein each of said first and second wheels urges said base toward each other wherein said base is configured to be aligned with an longitudinal axis extending through the cylinder when said base is moved in the cylinder, and
  a member being coupled to and extending upwardly from said top side of said base wherein said member is configured to be vertically oriented in the cylinder, said member having a distal end with respect to said base; and
a rotation unit being rotatably coupled to said cart wherein said rotation unit is configured to engage the inside of the cylinder, said rotation unit being electrically coupled to said control unit such that said control unit controls operational parameters of said rotation unit wherein said rotation unit is configured to rotate along the inside of the cylinder, said welding head being coupled to said rotation unit wherein said welding head is configured to weld the inside of the cylinder when said rotation unit rotates along the inside of the cylinder thereby facilitating one cylinder to be welded to another cylinder, said rotation unit comprising:
a hub having a front side, a back side and an outer surface extending therebetween, said outer surface being coupled to said distal end of said member, said hub having a central portion being rotatably coupled to an outer portion such that said central portion rotates about an axis being perpendicular to vertical axis,
a plurality of first arms, each of said first arms being coupled to and extending outwardly from said outer surface of said hub, said first arms being spaced apart from each other and being distributed around said hub, each of said first arms having a distal end with respect to said hub wherein said distal end corresponding to each of said first arms is configured to engage the inside of the cylinder, said distal end corresponding to each of said first arms being equidistant from said hub wherein each of said first arms is configured to centrally position said hub in the cylinder, each of said first arms having a first half being slidably coupled to a second half such that each of said first arms has a telescopically adjustable length wherein said plurality of first arms is configured to facilitate said hub to be centrally positioned in a variety of sizes of cylinder,
a tube being coupled to and extending away from said front side of said hub, said tube being positioned on said central portion of said hub such that said tube rotates with said central portion, said tube having a distal end with respect to said hub,
a motor being coupled to said hub, said motor engaging said central portion of said hub such that said motor rotates said central portion when said motor is turned on, said motor being electrically coupled to said welder control unit such that said welder control unit controls a rotational speed of said motor, and
a second arm being coupled to and extending downwardly from said cylinder, said second arm being aligned with said distal end of said cylinder, said second arm having a distal end with respect to said cylinder wherein said distal end of said second arm is configured to be spaced from the inside of the cylinder, said cylinder urging said distal end of said second arm to rotate about a circumference of the inside of the cylinder when said motor is turned on, said welding head being removably coupled to said second arm, said welding head being aligned with said distal end of said second arm wherein said welding head is configured to weld the inside of the cylinder, said wire feed being coupled to said second arm.

* * * * *